United States Patent
Bagchi (10) Patent No.: US 10,346,892 B1
(45) Date of Patent: Jul. 9, 2019

(54) METHOD FOR DYNAMIC VISUAL DESIGN CUSTOMIZATION

(71) Applicant: DZINE STEPS L.L.C., Eagle, ID (US)

(72) Inventor: Judy L. Bagchi, Eagle, ID (US)

(73) Assignee: DZINE STEPS L.L.C., Spring, TX (US)

( * ) Notice: Subject to any disclaimer, the term of this patent is extended or adjusted under 35 U.S.C. 154(b) by 1193 days.

(21) Appl. No.: 14/453,610

(22) Filed: Aug. 6, 2014

Related U.S. Application Data (60) Provisional application No. 61/862,527, filed on Aug. 6, 2013.

(51) Int. Cl.
  *G06Q 30/00* (2012.01)
  *G06Q 30/06* (2012.01)
  *H04L 29/06* (2006.01)
  *G06F 17/24* (2006.01)
  *H04L 29/08* (2006.01)

(52) U.S. Cl.
  CPC ......... *G06Q 30/0621* (2013.01); *G06F 17/24* (2013.01); *G06Q 30/0643* (2013.01); *H04L 67/22* (2013.01); *H04L 67/42* (2013.01)

(58) Field of Classification Search
  CPC ............ G06Q 30/0621; G06Q 30/0643; G06F 17/24; H04L 67/22; H04L 67/42
  See application file for complete search history.

(56) References Cited

U.S. PATENT DOCUMENTS

| | | | |
|---|---|---|---|
| 5,255,352 A | 10/1993 | Falk | |
| 6,052,669 A * | 4/2000 | Smith | G06F 17/50 703/1 |
| 7,062,722 B1 * | 6/2006 | Carlin | G06Q 30/02 715/781 |
| 7,277,572 B2 * | 10/2007 | MacInnes | G06F 17/5004 345/419 |
| 7,457,730 B2 * | 11/2008 | Degnan | G06T 11/60 52/235 |

(Continued)

FOREIGN PATENT DOCUMENTS

WO 2013191689 A1 12/2013

OTHER PUBLICATIONS https://techcrunch.com/2007/08/30/designmyroom-a-useful-tool-for-virtual-interior-design/ (Year: 2007).*

(Continued)

*Primary Examiner* — Matthew E Zimmerman
(74) *Attorney, Agent, or Firm* — Parry IP PLLC; Jeffrey C. Parry (57) ABSTRACT

A design customization tool is integrated with an online visual and searchable design elements database and collaboration tool over a network. Design elements are defined as single or collective real and/or abstract instances of any product, pattern, attribute, or feature. Methods provide uploading a picture or draw a target design space in digital format to the server for dynamic modification, customization, and realistic and real-time rendition and virtual visualization of design elements placed within the context of the design space. Methods include building a library of design elements and design concepts database showcasing design elements which can be independently used in different target design spaces with realistic rendition.

12 Claims, 11 Drawing Sheets

(56) References Cited

U.S. PATENT DOCUMENTS

| | | | | |
|---|---|---|---|---|
| 7,834,883 B2* | 11/2010 | Adams | G06Q 30/02 | 345/419 |
| 9,443,353 B2* | 9/2016 | Vaddadi | G06T 15/205 | |
| 2002/0032546 A1* | 3/2002 | Imamura | G06Q 30/0601 | 703/1 |
| 2002/0065635 A1* | 5/2002 | Lei | G06T 19/00 | 703/1 |
| 2005/0154574 A1* | 7/2005 | Takemura | H04L 12/2803 | 703/22 |
| 2006/0080316 A1* | 4/2006 | Gilmore | G06F 21/6209 | |
| 2007/0143082 A1* | 6/2007 | Degnan | G06T 11/60 | 703/1 |
| 2007/0156540 A1* | 7/2007 | Koren | G06Q 10/087 | 705/14.51 |
| 2007/0265927 A1* | 11/2007 | Salter | G06F 17/5004 | 705/26.1 |
| 2008/0071559 A1* | 3/2008 | Arrasvuori | G06Q 30/06 | 705/26.1 |
| 2009/0160856 A1* | 6/2009 | Hoguet | G06Q 10/06 | 345/420 |
| 2010/0161288 A1* | 6/2010 | Thomas | G06F 17/5004 | 703/1 |
| 2011/0093361 A1* | 4/2011 | Morales | G06Q 10/087 | 705/26.62 |
| 2011/0113320 A1* | 5/2011 | Neff | G06Q 10/10 | 715/230 |
| 2013/0073420 A1* | 3/2013 | Kumm | G06Q 10/101 | 705/26.5 |
| 2013/0113789 A1* | 5/2013 | Suzuki | G06T 19/006 | 345/419 |
| 2013/0211882 A1 | 8/2013 | Brashear | | |
| 2013/0259308 A1* | 10/2013 | Klusza | G06K 9/00624 | 382/103 |
| 2013/0335445 A1* | 12/2013 | Bala | G06F 3/147 | 345/633 |
| 2014/0132595 A1* | 5/2014 | Boulanger | G06T 19/20 | 345/419 |

OTHER PUBLICATIONS

Belight, Live Interior 3D Pro—Interior Design App for Professionals, Oct. 15, 2013, retrieved via Wayback Machine: http://web.archive.org/web/20131015070458/http://www.belightsoft.com/products/liveinterior/proversion.php.

Home Designer Software—Adding a Custom Material, Jun. 10, 2014, retrieved from http://www.homedesignersoftware.com/support/article/KB-00138.

\* cited by examiner

METHOD FOR DYNAMIC VISUAL DESIGN CUSTOMIZATION

CROSS-REFERENCE TO RELATED APPLICATIONS

This application claims priority to U.S. Provisional Patent Application Ser. No. 61/862,527, filed on Aug. 6, 2013, and titled "Dynamic visual design customization platform," the entire contents of which are hereby incorporated by reference.

BACKGROUND

The present disclosure relates generally to the field of computer-assisted design customization. In particular, the present disclosure relates to rendition of design elements within a target design space.

DESCRIPTION OF RELATED ART

The creative act of designing a product or space customized to the liking and need of the user of that product or space is a basic human endeavor. In modern days, aided by computers and software, architects, graphic designers, interior designer and people in similar trade visualize and design products for rest of the society to use. While these artistic people in the trade have the talent, training, and capability of visualizing a design subject and space in the abstract of their imagination, for the rest of us, that process can be daunting, and even frustrating. This causes many unhappy customers because the product 'just did not look right' in their space, resulting in economic waste in terms of money and time spent for both the professional and the customer.

Being a creative process, a satisfactory design is a source of joy and pride. A designer gets the best result by effectively collaborating with the customer on the concept and design. This can create the customer's own stake in the design from the beginning, resulting in fewer mistakes and ultimate happy customer. This creates customer stickiness and ability to generate further economic activity by testing various 'what if' scenarios thus enabling 'testing before buying'.

Various computer aided design, gaming software and other photo manipulation software like Adobe Photoshop has attempted to create and manipulate a digitized space. However, all of these software platforms need highly specialized skill to use or need special photographic device to take picture or a special computer to manipulate creating a barrier to use. Some solutions cater to a specific product manufactured by a specific manufacturer and does not work with other products. None of these solutions meet the need of designers and retailers who can visualize the abstract of a design in their head but are stymied by the lack of an avenue for realistic representation of their abstract concept within the context of the target design subject or space.

SUMMARY

In one embodiment, a method for customizing a design space is disclosed. The method includes receiving a digitized design space image from a client device, receiving, from the client device, a selection from the design space, transmitting, to the client device, one or more renditions of design elements to modify and customize the selection from the design space, receiving a selection of one or more selected design elements, transmitting instructions directing the client device to render an image of the selected one or more selected design elements in the design space image, and dynamically selecting other relevant design elements to dynamically and virtually customize the design space.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope thereof to those skilled in the art.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Figure 1A:
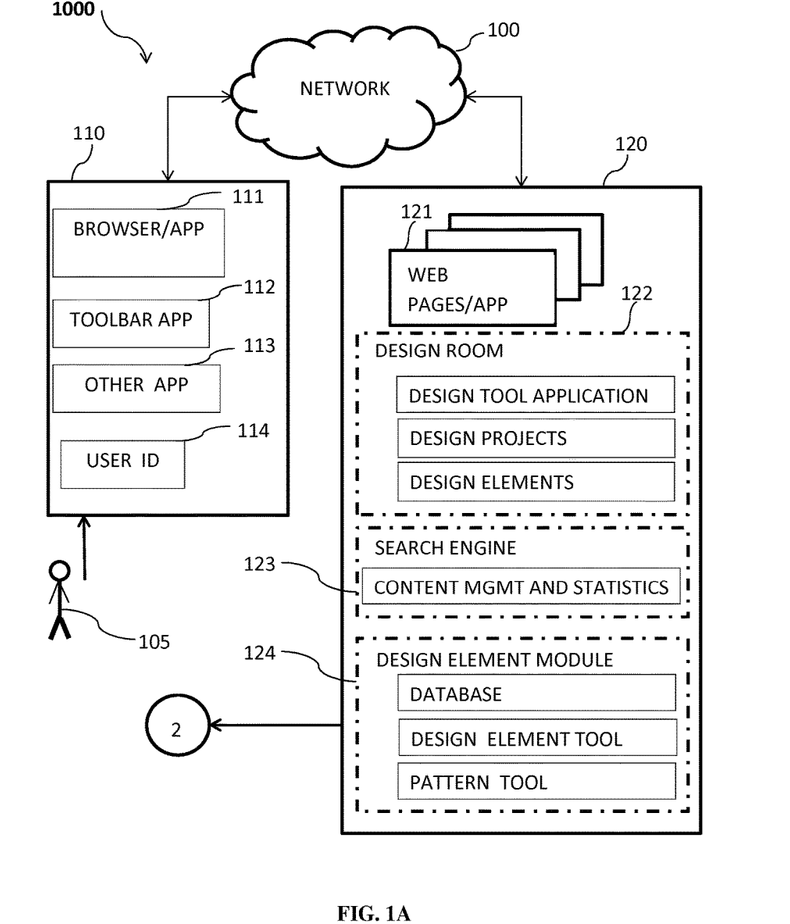
FIG. 1A illustrates a first part of an overall system and method for dynamic virtual design customization described herein.
Figure 1B:
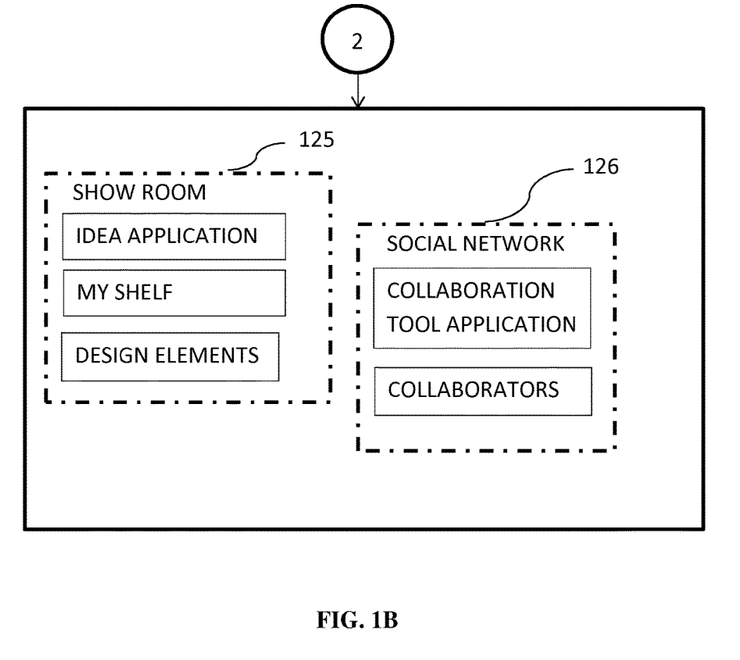
FIG. 1B illustrates a second part of an overall system and method for dynamic virtual design customization described herein.

Various embodiments of the present disclosure comprise systems and methods for providing a visual design customization tool. FIGS. 1A and 1B illustrate a block diagram of a networked system 100 configured to provide dynamic content in accordance with an embodiment of the method for system 1000. As shown, system 1000 includes a client device 110, a SAAS server 120, in communication over a network 100. The server 120 includes web pages/app pages 121, a search engine 123, a design elements module 124, a design room module, 122, a show room module, 125, a social network module 126.

Network 100 may be implemented as a single network or a combination of multiple networks. For example, in various embodiments, network 100 may include the Internet or one or more intranets, landline networks, wireless networks, and/or other appropriate types of networks.

Client device 110 may be implemented using any appropriate combination of hardware and/or software configured for wired and/or wireless communication over network 100. For example, in one embodiment, client device 110 may be implemented as a personal computer of a user 105 in communication with the Internet. In other embodiments, client 110 may be implemented as a wireless smartphone, tablet, notebook computer, and/or other types of computing devices.

As shown in FIGS. 1A and 1B, client device 110 may include one or more browser applications or native applications 111 which may be used, for example, to provide a convenient interface to permit user 105 to browse information available over network 100. For example, in one embodiment, browser application 111 may be implemented as a web browser configured to view information available over the Internet, while in another embodiment, application 111 may be an application configured to view information on a smartphone, tablet or computer with compatible operating system.

Client device 110 may also include one or more toolbar menu applications 112 which may be used, for example, to provide client-side processing for performing desired tasks in response to operations selected by user 105. In one embodiment, toolbar menu application 112 may display a user interface in connection with browser application or application 111.

Client device 110 may further include other applications 113 as may be to provide desired features to client device 110. For example, in various embodiments, such other applications 113 may include security applications for implementing client-side security features, programmatic client applications for interfacing with appropriate application programming interfaces (APIs) over network 100, or other types of applications.

As also shown in FIGS. 1A and 1B, client device 110 includes one or more user identifiers 114 which may be implemented, for example, as operating system registry entries, cookies associated with browser application 111, identifiers associated with hardware of client device 110, or other appropriate identifiers. In one embodiment, user identifier 114 may be used by the Design Room module to uniquely identify a design with a user with appropriate access control. In another embodiment, user identifier 114 may be the author of design concepts being showcased in the show room module.

Design element module 124 provides an online database of various products, patterns, attributes and/or feature elements as individual or a combination of data to be received over network 100. In this regard, module 124 includes a database which may be made available for viewing, use in creating a design element, or use in a design concept as a design element by user 105. As used herein, the term "design element" may refer to digitized renditions of single or collective real and/or abstract instance(s) of any product(s), pattern(s), attribute(s), and/or feature(s) to virtually customize a design space. Show room module 125 may also include the design elements database application which may be configured to serve information over network 100 to browser 111 of client 110. For example, in one embodiment, user 105 may interact with show room module 125 through browser application 111 over network 100 in order to search and view various products, abstract design concepts and their associated attributes including but not limited to description, marketing information, geometric measurement, texture, color, price etc.

Design room module 122 may include a design tool application to aid in the design process. In this regard, design room module includes design projects database, wherein each design project is associated with a unique user 105. The design tool application also references design elements. The design elements may be populated via the design elements module 124 design elements' database. In one embodiment the design room tool will allow user 105 to upload a digital format of the design subject for customization. In another embodiment the design room tool application will allow user 105 to use a blank canvas to start designing with. In another embodiment, user 105 may associate properties such as a specific design concept, theme, feature, or function with a design space. In an embodiment, user 105 may associate properties by applying tags to a design space. Examples of tags include room type (e.g. bedroom, kitchen, and bathroom), design style (e.g. Asian and contemporary), color, or any other tags as generated by user 105. The design room tool application includes several draw tools to select specific areas in the target design space; apply the selected design element; adjust the parameters to present a realistic rendition preserving all spatial, textual, geometric, environmental and other attributes of the design elements on the target design space. This process may also include removing of features from the target design space.

Show room module 125 may include an idea application, an idea database, and/or a "my shelf" application. The idea database may contain design elements within a design space displaying certain design themes, design concepts, and design ideas. In embodiments, the idea database contents maps to and uses user 105 information. The idea application may provide functions to create designs in the design room module 122, wherein user 105 may be able to select a design element from the show room design and use in his/her design project in the design room module application 122. User 105 may shortlist for future reference design concepts from the show room using the "my shelf" application.

According to embodiments of the present disclosure, the social network module 126 includes a collaboration tool application to enable instances of users 105 to share specific content from the design room module 122 with user identified collaborators. The social network module 126 may also include a receiver to provide user 105 with comments or suggested changes to his/her design project. User 105 may be able to accept, modify, and/or reject suggested changes to his/her design project.

Embodiments of the search engine 123 provide a content processing application which may select content to be provided to user 105 and communicate with the design element module 124. For example, in various embodiments, content processing application may be implemented with appropriate rules-based or heuristics-based facilities for selecting appropriate content for user 105 based on user activities associated with design room module 122 or show room module 125 or other characteristics. The content thus selected is presented via the design elements and design tool application in the design room module 122.

Figure 2A:
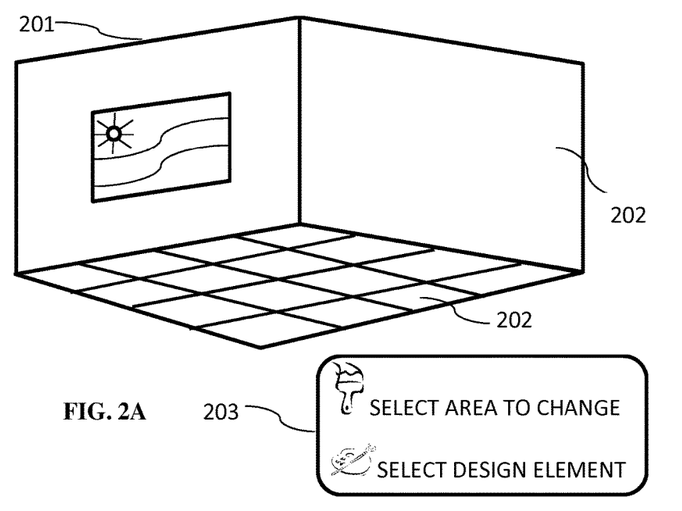
FIG. 2A is a screen shot of a room corner.
Figure 2B:
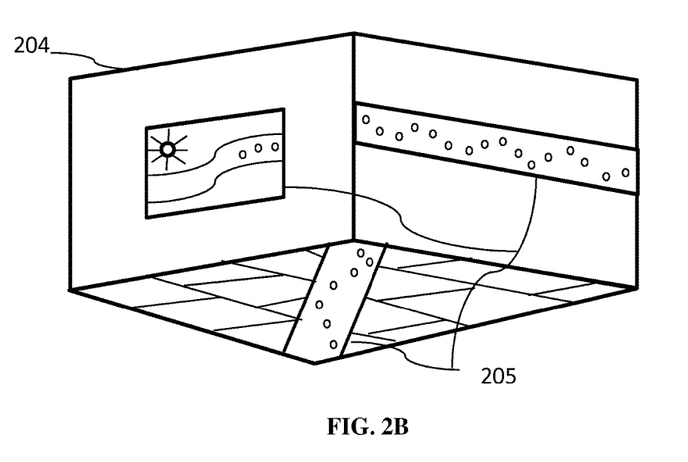
FIG. 2B is an exemplary screen shot of a room corner that is updated with a design element.

FIG. 2A depicts a screen shot of a room space 201 before any design elements have been applied. The flat surfaces 202 may be selected and modified using tool 203 of the design room tool application 122. The exemplary menu of the design tool 203 may enable the display of a list of design elements from design element module 124 to the user 105. In some embodiments, the menu includes a dropdown menu with multiple selections for design element categories and parameters to present a realistic rendition preserving all spatial, textual, geometric, environmental, and other attributes of the design elements on the target design space. FIG. 2B depicts a screen shot of room space 204 showing areas 202 modified with design element 205.

Figure 3A:
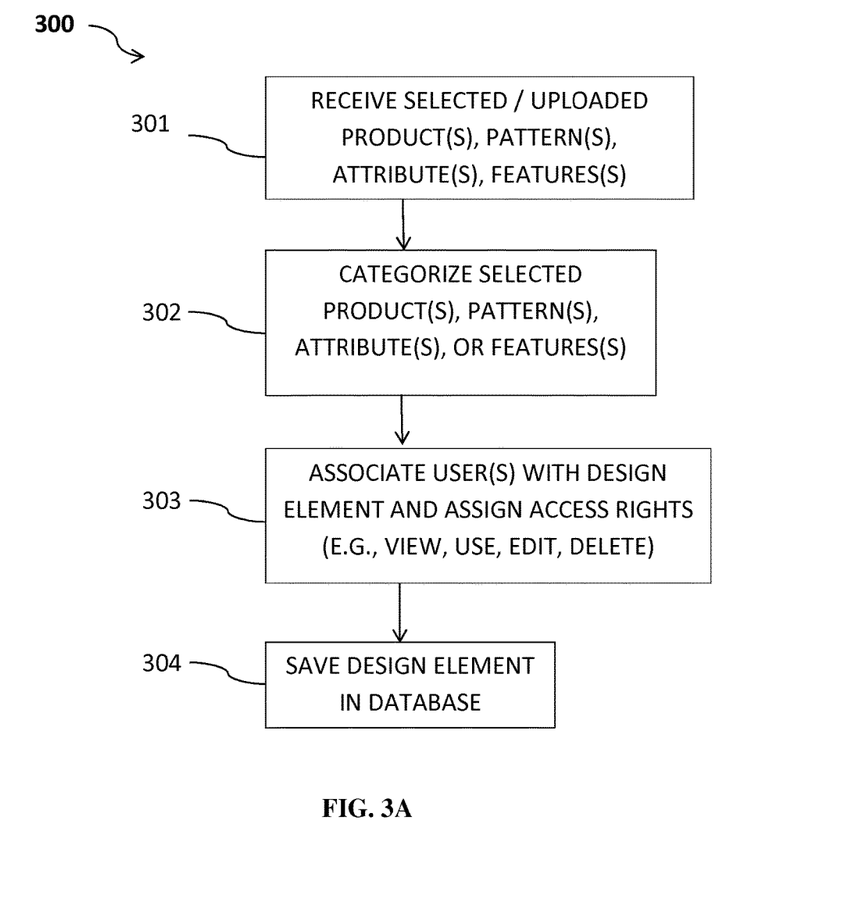
FIG. 3A is a flow diagram of an exemplary process for creating and saving a design element.

FIG. 3A illustrates a process of providing user 105 activities in accordance with an embodiment of method 300 for creating and saving a design element. In step 301, the user 105 may use browser application 111 to access a webpage or app page 210, to upload or select a design element such as a product, pattern, attribute or feature. In step 302, the user 105 may categorize the selected design element and set permission rights for other users who may have access to the design element module 124. The user may then save the design element to the database in design element module 124.

Figure 3B:
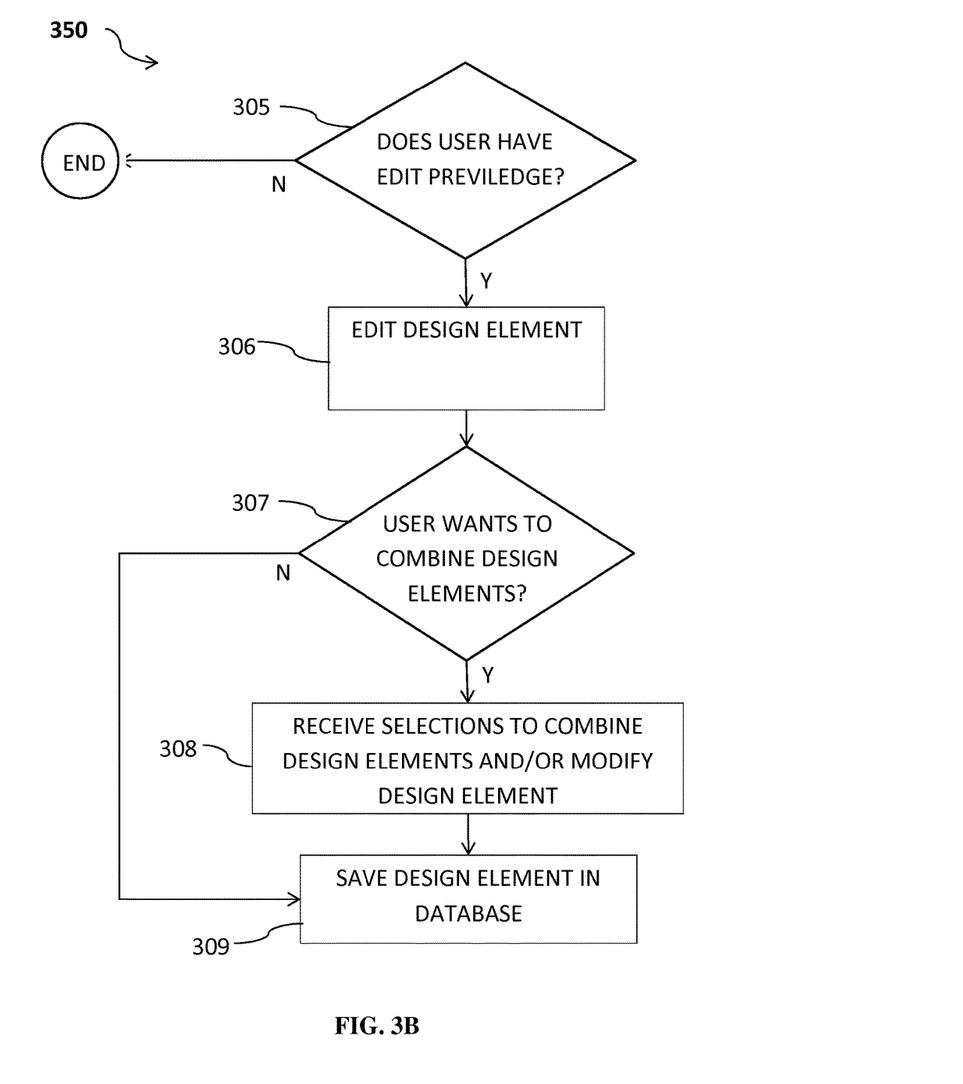
FIG. 3B is a flow diagram of an exemplary process for editing a design element.

FIG. 3B is a flow diagram of an exemplary process 350 for editing a design element. At step 305, if user 105 has right permission access to edit design element 306, then the user can modify the design element as in 308. For example, the user may determine to delete or modify a design element; or add a pattern, attribute or feature to a design element. Alternatively, the user may want to combine design elements into a single design element as shown in step 308. Advantageously, the user's decision to engage in such choices may be influenced by the particular dynamic content displayed to the user during step 308.

Figure 4A:
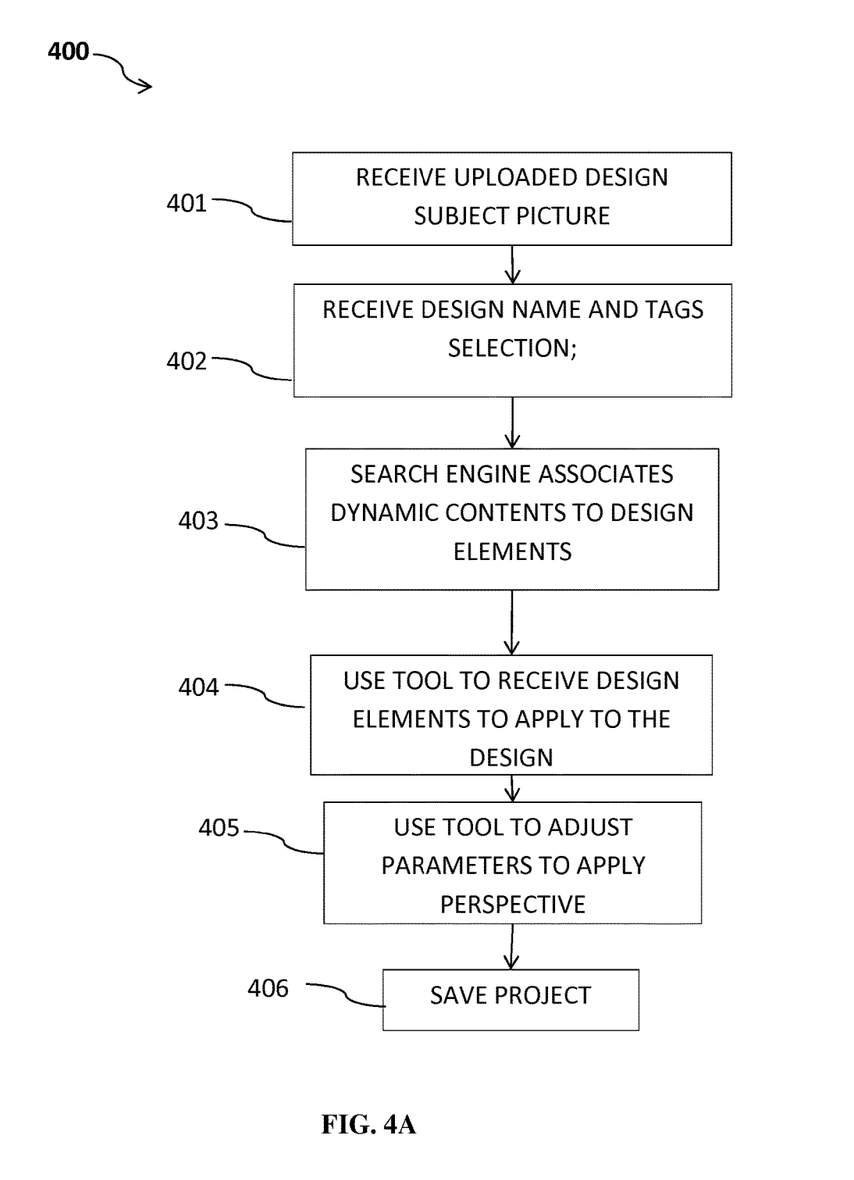
FIG. 4A is a flow diagram of an exemplary process for creating a project in the design room.

FIG. 4A is a flow diagram of an exemplary process 400 of creating a design project in the design room. In this regard, the first step is for the user 105 to upload a picture of the design subject or draw as in 401. As such, the user 105 provides the design project information. In step 403 the search engine associates dynamic content to design elements using information from step 402 and any associated information in updating the design project thereafter. The design room tool is used to select the specific area to change and find the appropriate new design element to display. The user 105 selects the best fit design element and adjusts the parameters to apply the most realistic rendition of the design element in the target design space picture as in step 405. The project is then saved.

Figure 4B:
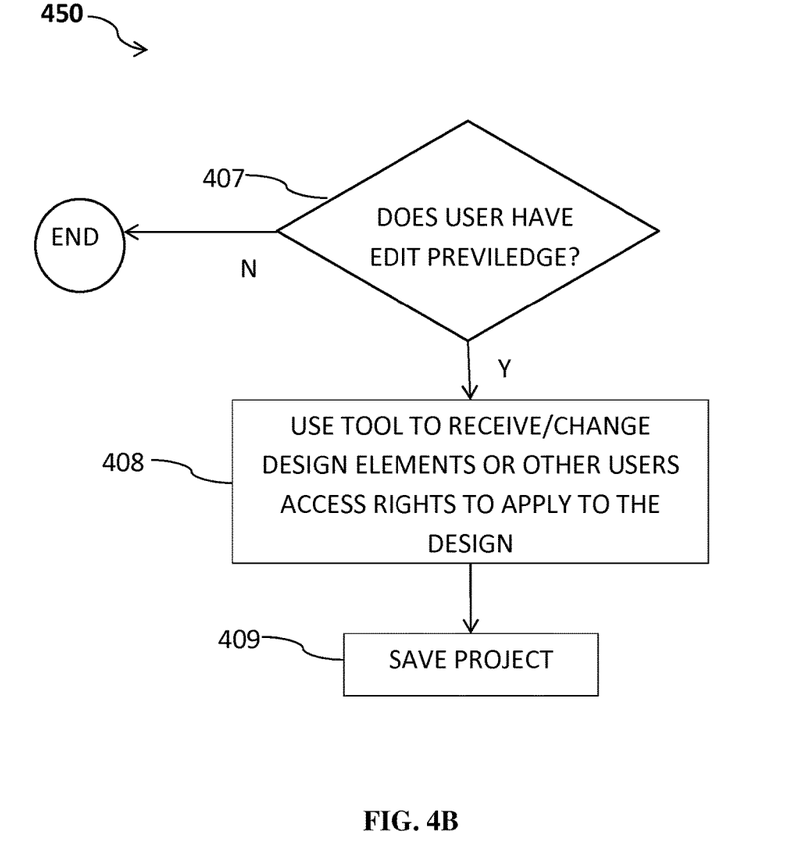
FIG. 4B is a flow diagram of an exemplary process to edit a project in the design room.

FIG. 4B is a flow diagram of an exemplary process 450 of editing a design project in the design room. At 407, the user 105 may select the design room application to open an existing design from the design room module 122. In step 407 after determining if the user 105 has the edit privilege for the design project, user may use the design room tool 122 to modify the design elements by either, adding deleting or changing the design element itself or its location on the target space or the parameters to give it a more appropriate realistic rendition based on perspective, texture, environmental conditions. The design project may now be saved.

Figure 5A:
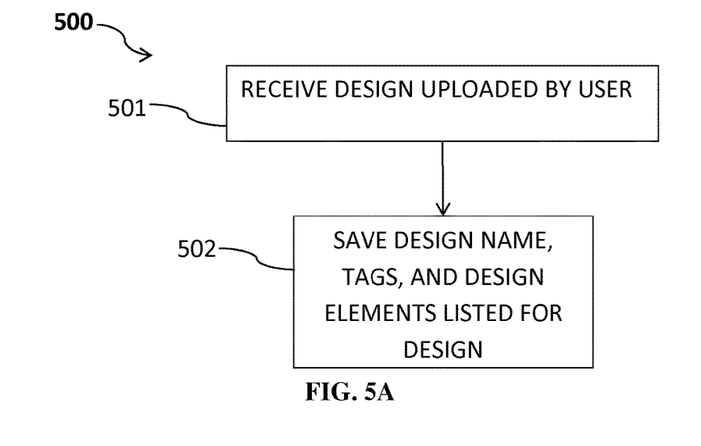
FIG. 5A is a flow diagram of an exemplary process to add a design in the virtual showroom.

FIG. 5A depicts process 500 for receiving a design uploaded by a user. According to embodiments, process 500 is representative of the activity to add a design project to the show room 125 to show the instances of users sample projects showing the usage of a list of one or more design elements by explicitly marking them as such and listing them. In addition, the user has the option to save the design project using appropriate name, tags and description. This is typically done using keywords that the search engine and filters will use.

Figure 5B:
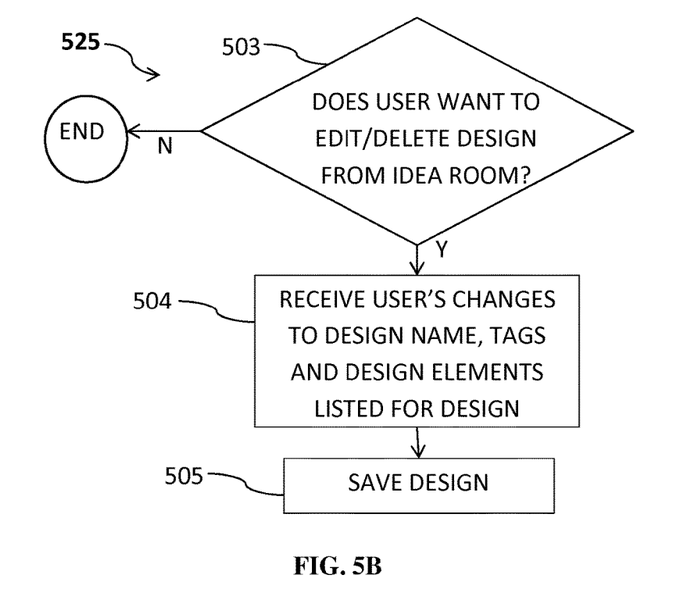
FIG. 5B is a flow diagram of an exemplary process to edit/delete a design in the showroom.

FIG. 5B is a flow diagram of an exemplary process 525 for editing or deleting a design concept or design element in the show room 125. Editing a design concept or design element entails either changing the name, tags, and other details like description or the design elements used and listed. Or deleting it altogether from the database.

Figure 5C:
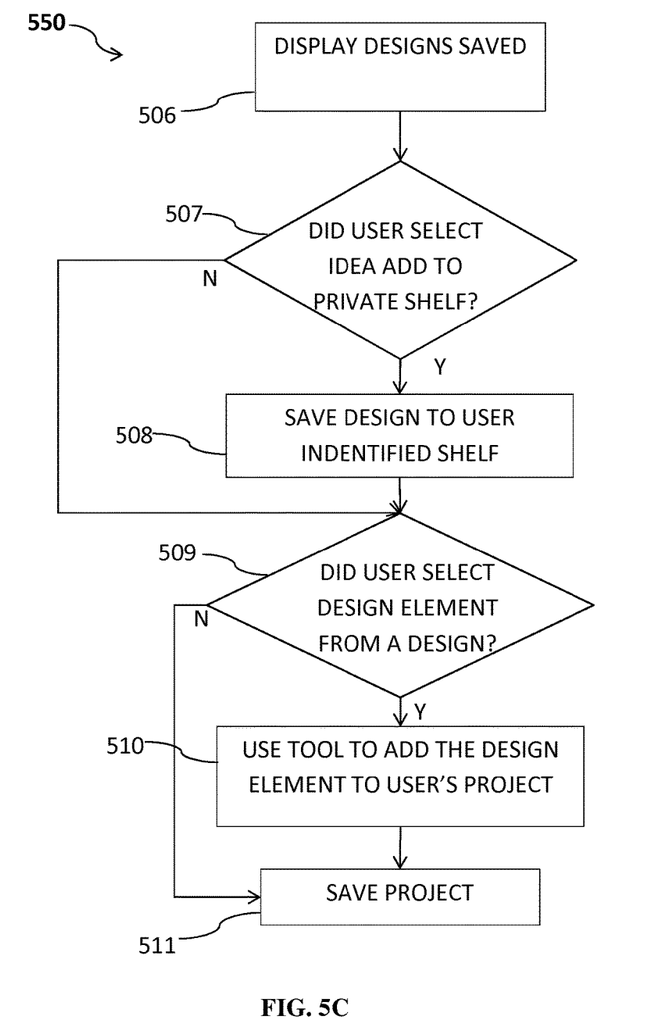
FIG. 5C is a flow diagram of an exemplary process to virtually bookmark a design concept by adding it to a shelf. This flow also outlines the process that a design element in an Idea may be used in the user's design concept.

FIG. 5C depicts process 550 for adding to a user-chosen name of a virtual shelf or for selecting a particular design element. According to embodiments, a flow diagram of process 550 depicts the show room functions, wherein the user 105 may add to a user chosen name of a virtual shelf, to bookmark a particular idea. Furthermore, this includes an embodiment of the capability to select a particular design element in a design idea to apply directly to the user's target design space. This provides a virtual fitting room for a design element on a virtual context based showcase.

Figure 6A:
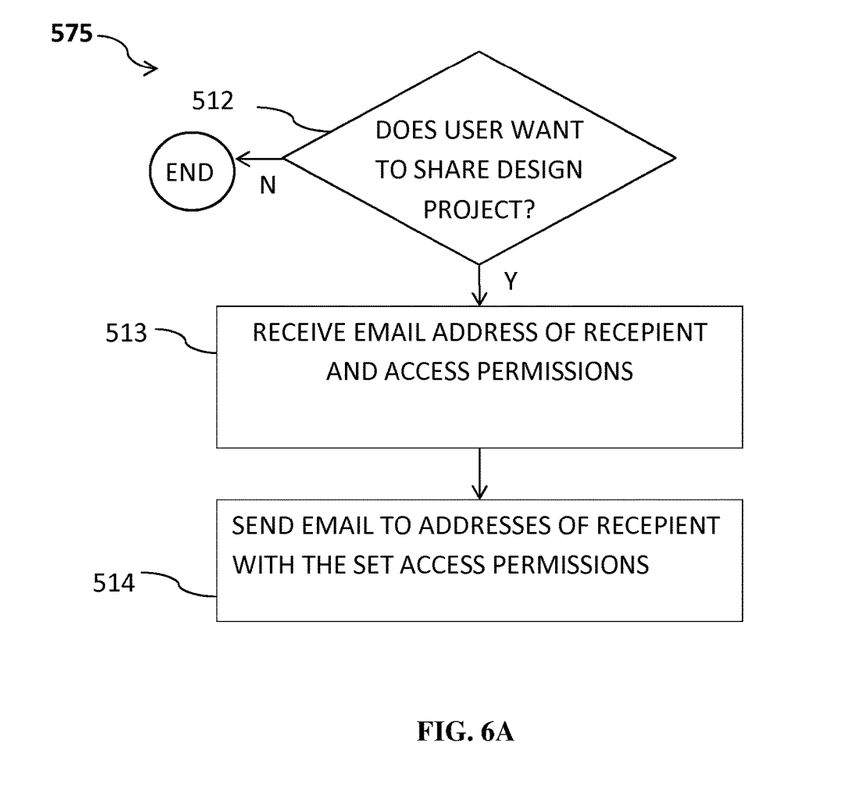
FIG. 6A is a flow diagram of an exemplary process to collaborate with specific customers, designers and or professionals on a particular design concept.

FIG. 6A is a flow diagram for using a social network to choose specific collaborators to share a design project according to an example process 575. The user 105 may add the email addresses of the collaborator he/she wants to share his/her design with. The user 105 may specify the access permission rights granting the viewer appropriate actions such as but not limited to reviewing the design, commenting on the design, editing the design by altering the design elements parameters or content itself. In step 513, provides the user a chance to share the design with friends/and or professionals and also get quotes if needed.

Figure 6B:
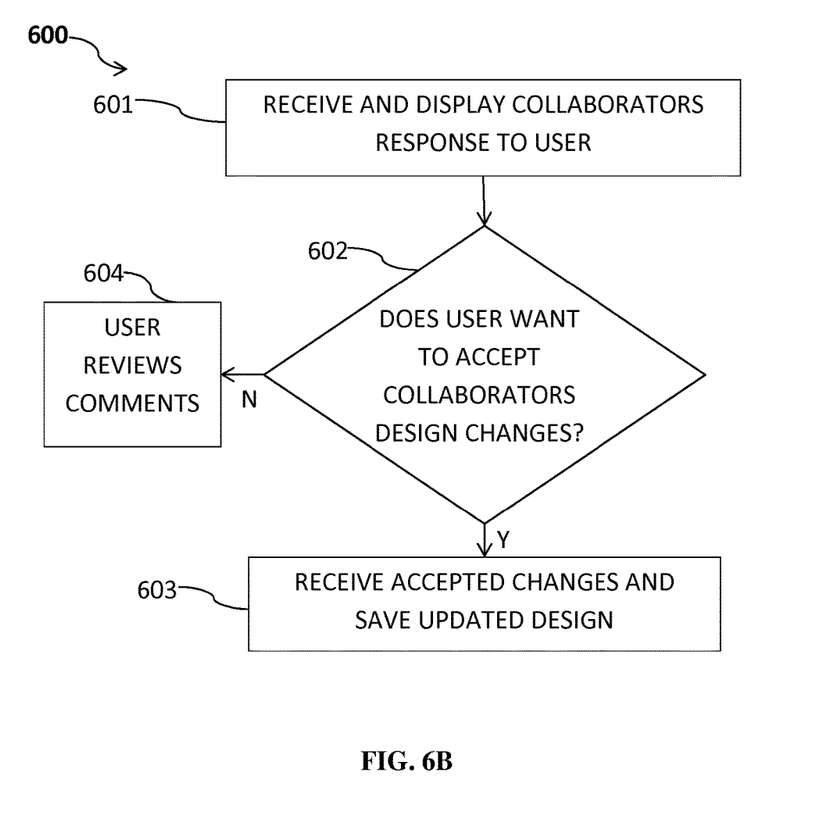
FIG. 6B is a flow diagram of an exemplary process to respond to collaborators response on a particular design concept.

FIG. 6B is a flow diagram depicting an illustrative method 600 for using the social network to review responses from collaborators. The collaborator may provide feedback on the design project by commenting and/or applying a design change. The user 105 may be able to accept, modify or reject a suggested design change.

Several embodiments are specifically illustrated and/or described herein. However, it will be appreciated that modifications and variations are covered by the above teachings and within the scope of the appended claims without departing from the spirit and intended scope thereof. For example, the design element from the design element library may be searched for by a predetermined character string (e.g., a particular name or tag). A filter may be applied to the design element to remove predetermined content, for example, content about a subject of which the viewing user is not interested to use in his/her design.

Where applicable, various embodiments provided by the present disclosure can be implemented using hardware, software, or combinations of hardware and software. Software in accordance with the present disclosure, such as program code and/or data, can be stored on one or more computer readable mediums in the cloud as SAAS.

According to various embodiments, one application of the present disclosure may be in the field of interior and exterior design. Another application may be in clothing design specifically in customized clothing. Another application may be in manufacturing of floor and wall covering products including wall-art. Yet another application could be in 3D printing. There may be other present and future applications not explicitly mentioned in this disclosure.

Having thus described embodiments of the method, persons of ordinary skill in the art will recognize that the dynamic virtual design customization method may be used in various design customization applications.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A method comprising:
    receiving, at a server, a digitized design space image from a client device;
    receiving, from the client device, a selection of a surface in the design space image to change;
    assigning, at the server, one or more design elements with access permission rights for a user;
    identifying, at the server, the access permission rights associated with the user;
    identifying, at the server, a user accessible virtual private shelf, the virtual private shelf being associated with a design theme, a design concept, or a design idea;
    identifying, at the server, the one or more design elements to which the user has access permission rights and that are saved in the virtual private shelf;
    transmitting, to the client device, one or more of the identified design elements that correspond to the surface to change the surface selection from the design space image;
    receiving a selection of one or more selected design elements;
    transmitting instructions directing the client device to render an image in the design space image of the selected one or more design elements having a perspective attribute, a spatial attribute, an environmental attribute and a geometric attribute that align to a perspective attribute, a spatial attribute, an environmental attribute, and a geometric attribute of the surface in the design space image;
    modifying the perspective attribute, the spatial attribute, the environmental attribute, or the geometric attribute of the one or more design elements based on a user-submitted modification action;
    receiving, from the client device, the design space modified with selected design elements;
    receiving, from the client device, an identifier for the virtual private shelf to store the received design space; and
    storing, in the virtual shelf, the received design space.

2. The method of claim 1, further comprising:
    receiving additional selections from the design space and identifying each selection with a unique identifier.

3. The method of claim 1, further comprising estimating a cost of the design space based on the selected one or more selected design elements.

4. The method of claim 1, further comprising:
    receiving data associated with a digitized instance of the one or more selected design elements and
    transmitting, to the client device, instructions to use the data for dynamic placement and rendition of the one or more selected design elements in the design space.

5. The method of claim 1, further comprising receiving the one or more selected design elements based on properties of the design space.

6. The method of claim 1, further comprising limiting access to data regarding the design space based on user identifiers.

7. The method of claim 1, further comprising:
    transmitting, to the client device, a first contextual design element suggestion in response to a user activity on the client device;
    transmitting, to the client device, instructions to display a suggested design element corresponding to the first contextual design element suggestion; and
    transmitting, to the client device, a second design element suggestion associated with the first contextual design element suggestion.

8. The method of claim 1, further comprising:
    statistically tracking user preferences with respect to design elements, style, trends, and liking for a single user or for a group of users.

9. The method of claim 1, further comprising:
    soliciting ideas regarding customization of the design space;
    providing one or more textual or visual comments regarding the design space;
    receiving a suggestion for a modification to the design space by changing or placing one or more design elements in an image of the design space;
    sharing the modification to the design space via e-mail or social media; and,
    accepting or rejecting the modification to a design space.

10. The method of claim 9, further comprising providing marketing material, trademark, or other unique attributes of a creator of the modification to the design space.

11. The method of claim 1, further comprising removing a selected feature from the design space image based on a user-submitted deletion action.

12. The method of claim 1, further comprising applying a user-defined tag to the design space image based on a user-submitted tag action.

* * * * *